United States Patent
Moulsley et al.

(10) Patent No.: US 7,561,893 B2
(45) Date of Patent: Jul. 14, 2009

(54) COMMUNICATION SYSTEM USING ARQ

(75) Inventors: Timothy J. Moulsley, Caterham (GB); Matthew P. J. Baker, Canterbury (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 602 days.

(21) Appl. No.: 10/510,260

(22) PCT Filed: Feb. 28, 2003

(86) PCT No.: PCT/IB03/00962

§ 371 (c)(1), (2), (4) Date: Oct. 5, 2004

(87) PCT Pub. No.: WO03/085878

PCT Pub. Date: Oct. 16, 2003

(65) Prior Publication Data

US 2005/0143114 A1 Jun. 30, 2005

(30) Foreign Application Priority Data

| Apr. 10, 2002 | (GB) | ................................. | 0208235.2 |
| Apr. 30, 2002 | (GB) | ................................. | 0209820.0 |
| Aug. 8, 2002 | (GB) | ................................. | 0218395.2 |

(51) Int. Cl.
*H04B 7/00* (2006.01)
(52) U.S. Cl. .......................... 455/522; 455/69; 370/318
(58) Field of Classification Search ................ 455/522, 455/69; 370/318; 714/748
See application file for complete search history.

(56) References Cited

U.S. PATENT DOCUMENTS

| 5,933,763 A | * | 8/1999 | Wang et al. ................. 340/7.22 |
| 6,035,209 A | * | 3/2000 | Tiedemann et al. .......... 455/522 |
| 7,185,256 B2 | * | 2/2007 | Miki et al. ................... 714/751 |
| 7,203,182 B2 | * | 4/2007 | Hwang ........................ 370/338 |
| 7,315,975 B2 | | 1/2008 | An et al. |
| 2002/0028691 A1 | | 3/2002 | Moulsley et al. |
| 2002/0101835 A1 | * | 8/2002 | Gerakoulis ................... 370/329 |
| 2003/0157953 A1 | * | 8/2003 | Das et al. ..................... 455/522 |

FOREIGN PATENT DOCUMENTS

| EP | 1143635 A1 | 10/2001 |
| JP | 06350503 A | 12/1994 |
| JP | 2001053790 A | 2/2001 |

(Continued)

*Primary Examiner*—Duc Nguyen
*Assistant Examiner*—Angelica M Perez

(57) ABSTRACT

A communication system comprises a downlink data channel for the transmission of data packets from a primary station to a secondary station and two uplink control channels, a first channel for transmission of status signals to indicate the status of received data packets and a second channel for transmission of pilot information. In operation, on detection (402) of a data packet the secondary station increases (404) the transmission power of the second channel, thereby enabling the primary station to obtain a better estimate of uplink channel properties and hence increase the accuracy with which it can decode the status signal. The secondary station transmits (406) the status signal, typically either an acknowledgement (ACK) or negative acknowledgement (NACK), and decreases (408) the transmission power of the second control channel signal. The increase and decrease in power are not necessarily identical, for example as a result of the effects of power control.

12 Claims, 2 Drawing Sheets

FOREIGN PATENT DOCUMENTS

| | | | |
|---|---|---|---|
| JP | 2001128238 A | 5/2001 | |
| WO | WO 98/26619 | * | 6/1998 |
| WO | 0219605 A2 | 3/2002 | |
| WO | 03085878 A1 | 10/2003 | |
| WO | 2005048498 A2 | 5/2005 | |

* cited by examiner

COMMUNICATION SYSTEM USING ARQ

TECHNICAL FIELD

The present invention relates to a communication system and further relates to primary and secondary stations for use in such a system and to a method of operating such a system. While the present specification describes a system with particular reference to the Universal Mobile Telecommunication System (UMTS), it is to be understood that such techniques are equally applicable to use in other communication systems.

BACKGROUND ART

There is a growing demand in the mobile communication area for a system having the ability to download large blocks of data to a Mobile Station (MS) on demand at a reasonable rate. Such data could for example be web pages from the Internet, possibly including video clips or similar. Typically a particular MS will only require such data intermittently, so fixed bandwidth dedicated links are not appropriate. To meet this requirement in UMTS, a High-Speed Downlink Packet Access (HSDPA) scheme is being developed which may facilitate transfer of packet data to a mobile station at up to at least 4 Mbps.

A conventional component of a packet data transmission system is an ARQ (Automatic Repeat reQuest) process, for handling data packets received in error. For example, consider downlink packet transmission from a Base Station (BS) to a Mobile Station (MS) in HSDPA. When the MS receives a data packet it determines whether the packet has been corrupted, for example using Cyclic Redundancy Check (CRC) information. It then transmits a signal in a field allocated for this purpose to the BS, with a first signal used as an acknowledgement (ACK), to indicate that the packet was successfully received, and a second signal used as a negative acknowledgement (NACK), to indicate that the packet was received but corrupted. The signals may for example be different codewords or the same codeword transmitted at different powers.

In the presently-defined scheme for HSDPA a number of channels are defined, each handling different types of information: only those relevant to the present invention will be discussed here. Data packets are transmitted from the BS to the MS on a (high speed) downlink data channel, and in the reverse direction on an uplink data channel. Two uplink control channels are defined for signalling by the mobile. Transmission of ACK/NACK messages is performed on a first uplink control channel (a High Speed Dedicated Physical Control CHannel, HS-DPCCH), while transmission of pilot information, to enable the BS to obtain a channel estimate of the uplink channel, is performed on a second uplink control channel (a DPCCH). The power level of the second control channel is set by the BS using closed loop power control. The power level of the uplink data channel is determined from the power of the second control channel. The ratio of these two power levels is determined by a gain factor which may be signalled to the MS or determined independently by the MS.

The consequences of errors in ACK and NACK messages are significantly different. Normally the BS would retransmit a packet if a NACK were received. If the BS receives a NACK when an ACK is sent, then the packet is re-transmitted anyway. This only wastes a little system resource. If a NACK is sent, but received as an ACK, then no re-transmission is sent. Without special physical layer mechanisms, this situation can only be recovered from by using higher layer processes, which add delay and represent a significant waste of system resources. Thus the cost of an error in a NACK is much more serious than the cost of an error in a ACK, and consequently the performance requirements in 3GPP have been set at $10^{-2}$ for ACK errors and $10^{-4}$ for NACK errors. Achieving these error rates require good channel estimates. In particular, the channel phase is needed to determine correctly the phase of data symbols when phase modulation is used (for example BPSK or QPSK). For a modulation scheme where amplitude is also significant, such as m-QAM (where m may for example be 16), the channel amplitude would also be needed.

DISCLOSURE OF INVENTION

An object of the present invention is to address the need for good channel estimates.

According to a first aspect of the present invention there is provided a communication system having a downlink data channel for the transmission of data packets from a primary station to a secondary station, a first uplink control channel for the transmission of information relating to reception of data packets from the secondary station to the primary station, and a second uplink control channel for the transmission of pilot information, the secondary station having receiving means for receiving a data packet and acknowledgement means for transmitting a status signal on the first control channel to the primary station to indicate the status of a received data packet, wherein the secondary station comprises power control means for temporarily increasing the transmission power of at least the part of the second control channel including pilot information for a predetermined period during which the status signal is transmitted.

The temporary increase in the transmission power of pilot signals can improve channel estimation and hence accuracy of detection of ACK/NACK messages without significantly increasing overall interference levels. The power increase at the start of the period of temporarily increased power may differ from the decrease at the end of the period, for example as a result of the actions of inner-loop power control.

According to a second aspect of the present invention there is provided a primary station for use in a communication system having a downlink data channel for the transmission of data packets from the primary station to a secondary station, a first uplink control channel for the transmission of information relating to reception of data packets from the secondary station to the primary station, and a second uplink control channel for the transmission of pilot information, wherein means are provided for receiving a status signal on the first control channel indicating the status of a data packet transmitted to the secondary station, closed loop power control means are provided for controlling the power of the uplink control channel, and means are provided for adjusting the operation of the power control means for a predetermined period around a time when transmission of a status signal by the secondary station is expected to take into account a temporary increase of the transmission power of at least the part of the second control channel including pilot information.

According to a third aspect of the present invention there is provided a secondary station for use in a communication system having a downlink data channel for the transmission of data packets from a primary station to a secondary station, a first uplink control channel for the transmission of information relating to reception of data packets from the secondary station to the primary station, and a second uplink control channel for the transmission of pilot information, wherein receiving means are provided for receiving a data packet from the primary station and acknowledgement means are provided for transmitting a status signal on the first control channel to the primary station to indicate the status of a received data packet, wherein power control means are provided for temporarily increasing the transmission power of at least the part of the second control channel including pilot information for a predetermined period during which the status signal is transmitted.

According to a fourth aspect of the present invention there is provided a method of operating a communication system having a downlink data channel for the transmission of data packets from a primary station to a secondary station, a first uplink control channel for the transmission of information relating to reception of data packets from the secondary station to the primary station, and a second uplink control channel for the transmission of pilot information, the method comprising the secondary station receiving a data packet and transmitting a status signal on the first control channel to the primary station to indicate the status of a received data packet, wherein the secondary station temporarily increases the transmission power of at least the part of the second control channel including pilot information for a predetermined period during which the status signal is transmitted.

BRIEF DESCRIPTION OF DRAWINGS

Embodiments of the present invention will now be described, by way of example, with reference to the accompanying drawings, wherein.

In the drawings the same reference numerals have been used to indicate corresponding features.

MODES FOR CARRYING OUT THE INVENTION

Figure 1:
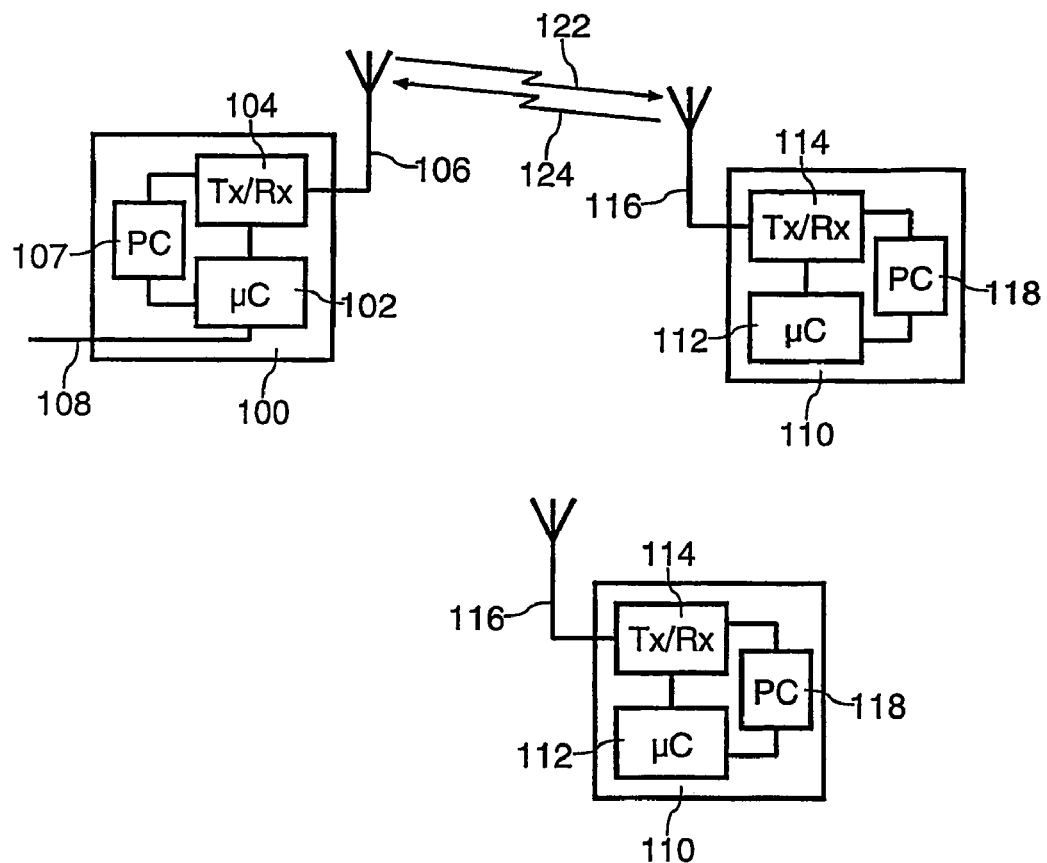
FIG. 1 is a block schematic diagram of a radio communication system.

Referring to FIG. 1, a radio communication system comprises a primary station (BS) 100 and a plurality of secondary stations (MS) 110. The BS 100 comprises a microcontroller (µC) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller (µC) 112, transceiver means (Tx/Rx) 114 connected to antenna means 116, and power control means (PC) 118 for altering the transmitted power level. Communication from BS 100 to MS 110 takes place on a downlink channel 122, while communication from MS 110 to BS 100 takes place on an uplink channel 124.

Figure 2:
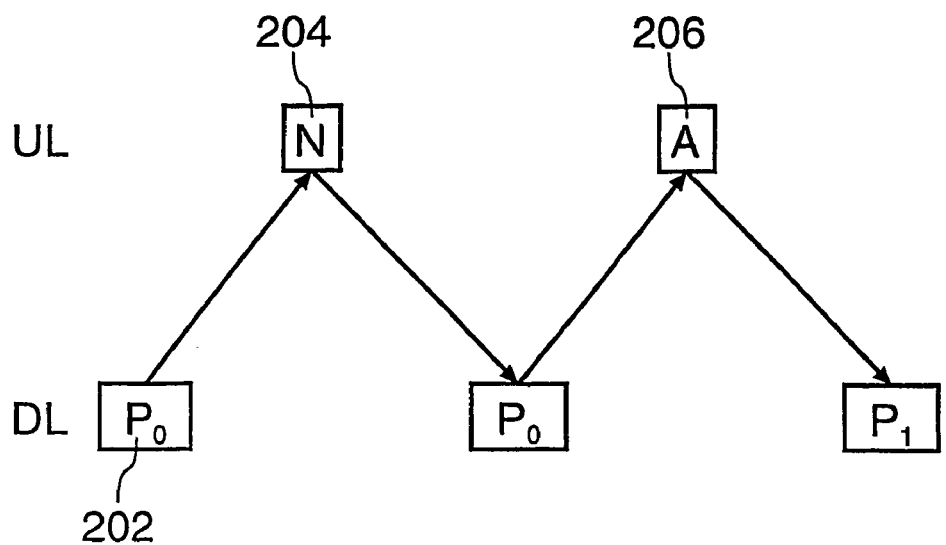
FIG. 2 is a diagram illustrating operation of a known stop-and-wait ARQ scheme.

An example of the operation of a known stop-and-wait ARQ scheme is illustrated in FIG. 2. Data packets 202, identified as $P_n$ where n is a one-bit sequence number, are transmitted in allocated time slots on a downlink data channel (DL) 122 from a BS 100 to a MS 110. The first data packet $P_0$, with sequence number 0, is received in a corrupted state by the MS 110, which therefore transmits a negative acknowledgement (N) 204 on a first uplink control channel in a field reserved for transmission of positive and negative acknowledgements. In response to this the BS 100 retransmits the first data packet 202, which this time is received correctly by the MS 100 which transmits an acknowledgement (A) 206. The BS 100 then transmits the next packet, with sequence number 1. The BS 100 also retransmits a data packet 202 if it receives no acknowledgement within a predetermined time-out period (in case the MS 110 did not receive the packet at all or the acknowledgement was lost). If the MS 110 did in fact receive the previously transmitted packet 202 it can determine that the received packet 202 is a retransmission as it has the same sequence number as the previous packet.

Figure 3:
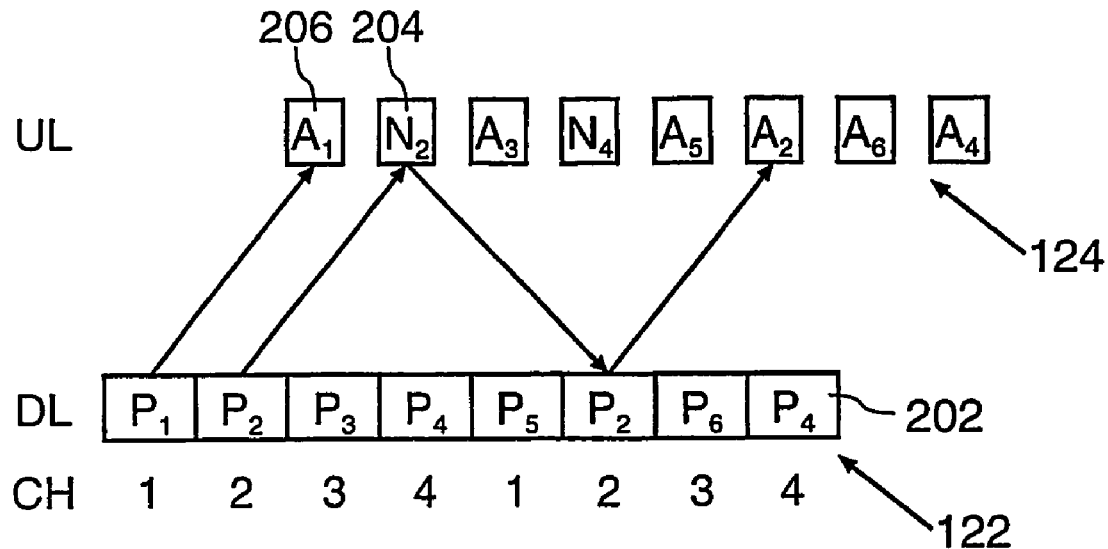
FIG. 3 is a diagram illustrating operation of a known n-channel ARQ scheme.

Improved throughput can be obtained by use of multi-channel ARQ schemes. An example of a 4-channel ARQ scheme operating in known manner is illustrated in FIG. 3. Data packets 202, identified as $P_n$ where n is a sequence number, are transmitted in sequence on a downlink channel (DL) 122 from a BS 100 to a MS 110. Each packet 202 is assigned to a logical channel (CH) in turn, starting with the first packet. Hence, packet $P_1$ is assigned to channel 1, packet $P_2$ to channel 2 and so on. ARQ is performed separately for each channel.

In the illustrated scenario, the first data packet $P_1$ is sent via the first logical channel and is received correctly by the MS 110, which transmits an acknowledgement ($A_1$) 206 on an uplink channel 124. Hence, when channel 1 is next scheduled for transmission, the next packet awaiting transmission, $P_5$ is selected and transmitted to the MS 110. Similarly, the second data packet $P_2$ is sent via the second logical channel. However, this packet is not received correctly by the MS 110, which issues a negative acknowledgement ($N_2$) 204. Hence, when channel 2 is next scheduled for transmission, packet $P_2$ is transmitted again. This time it is correctly received, and an acknowledgement 206 is issued on the uplink channel 124, thereby freeing channel 2 to transmit further packets 202.

As discussed above, in order for the BS 100 to achieve the required accuracy levels in decoding ACK/NACK messages, a good channel estimate is required. The channel estimate is performed, in known manner, from reception of pilot information transmitted on a second uplink control channel. The power level of the second uplink control channel is normally set to provide the correct power level for the uplink data channel according to the relative gain factor between the two channels. However, in this case the power level set for the second uplink control channel may not be high enough to enable sufficiently good channel estimation for reliable detection of ACK/NACK messages at the same time.

In a system made in accordance with the present invention, this problem is addressed by temporarily increasing the power of the second uplink control channel (or at least the portion of the channel including the pilot information) when an ACK/NACK message is to be transmitted. Following transmission of the message the power level is reduced by the same amount.

Figure 4:
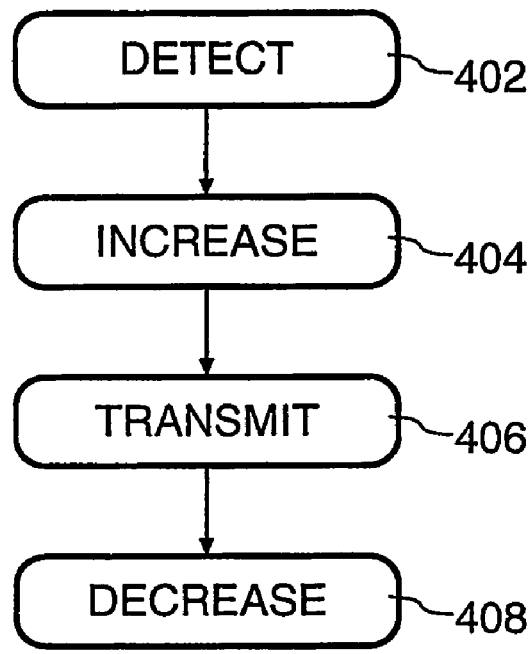
FIG. 4 is a flow chart showing a method of operating a packet data transmission system in accordance with the present invention.

The operation of such a system will be explained with reference to the flow chart shown in FIG. 4. The method starts, at step 402, with the MS 110 detecting a downlink data packet 202. In response to this detection the MS 110 increases, as step 404, the transmission power of the second control channel by a predetermined amount. The MS 110 then determines whether or not the data packet was received correctly, and transmits an ACK 206 or a is NACK 204 as appropriate, as step 406. Finally, at step 408, the MS 110 reduces the transmission power of the second control channel by a predetermined amount, which is not necessarily identical to the amount by which the power was increased in step 404. An example of a situation where different amounts may be required is in a system where the start and end of the period of temporarily increased power occur at the same time as (and are therefore combined with) regular inner-loop power control steps. The power control steps could well be in opposite directions at the start and end of the period, leading to the amounts of the increase and decrease in power being different.

In a HSDPA embodiment, the presence of a packet destined for a MS 110 is signalled by a packet indicator message on a packet indicator channel and/or a control channel distinct from the packet transmission channel. In such an embodiment, the trigger for increasing the transmission power of the second control channel could require the correct decoding of an associated downlink control channel (including a CRC), in addition to the detection of a packet indicator. This should help to avoid spurious triggering of the timer by false detection of a packet indicator.

Once a packet indicator message has been detected, the power increase could be applied at the start of the slot in the second uplink control channel immediately before the scheduled time for transmission of an ACK/NACK message on the first uplink control channel. The power increase could then be removed at the end of the slot following the transmission of the ACK/NACK message (or optionally later). This arrangement permits the possibility of transmitting more than one set of pilot symbols at the higher power level, which should assist the BS 100 in tracking channel changes. However, ideally the period of increased transmission power should always include at least one pilot field (comprising a complete set of pilot symbols or bits). It should be noted that there is no requirement for the first and second uplink control channels to have their slots aligned (or even of equal duration). Similarly there is no need for power changes to be applied at slot boundaries, although this is particularly convenient for HSDPA.

The power increase could be defined as a power offset (which would therefore have to be positive) with respect to the normal power level of the second uplink control channel. In this case normal power control operation of this channel would apply after the offset had been applied or removed, since the BS 100 would be aware of the rules used by the MS 110 to apply the power offset and could modify power control operation accordingly (if needed). However, a difficulty with this is that the BS 100 would not necessarily have complete knowledge of whether the mobile was using an offset (since this depends on detection of a data packet).

A range of variations on the basic scheme described above is possible. For example:

The power offset could be fixed for all mobiles, or signalled to the mobile. If signalled, the signalling could be via a normal signalling channel or, in the case of HSDPA, via the HS-SCCH (High Speed Shared Control CHannel), which would allow faster updating of the power offset in response to changing channel conditions.

Different power offsets could be applied for ACK 206 and NACK 204 messages. However, there would be an additional delay before the packet status was known. The choice of power offsets would represent a balance between performance and interference.

If the power offset is signalled the value could be determined according to a predetermined detection threshold at the BS 100.

It could be desirable to update the power offset and other parameters (e.g. number of repetitions of ACK/NACK) at the same time, in order to maintain substantially constant reliability of ACK/NACK messages.

The power offset could be changed during the period of increased power (e.g. starting with an initial value and changing when the packet status was known).

The duration of the power offset could also be set by a timer, starting from the point at which a data packet is detected or received. Such a timer would typically be implemented as a counter counting in predetermined units, for example milliseconds, frames, time slots, messages or other suitable units.

Any power offset applied in accordance with the present invention could be applied in addition to power offsets determined by other mechanisms, such as power changes signalled to the MS 110 or changes made for other purposes than those discussed here.

As a more detailed example for UMTS HSDPA, the reliability of ACK/NACK can be improved by repetition of the ACK/NACK message. However, it may not be permitted to send more data packets during the repetition period, which would limit the achievable bit rate. Therefore, if the required bit rate increases it could be necessary to reduce the number of repetitions of ACK/NACK. To maintain substantially the same overall reliability of ACK/NACK, a power offset could be applied at the same time, either to increase the DPCCH power, or to the power of the HS-DPCCH (which carries ACK/NACK) relative to the DPCCH. If this signalling is carried on the HS-SCCH, then it is desirable to minimise the total number of bits used. If two bits were allocated then four different combinations could be signalled, as in the following table:

| Signalled Bit Pattern | Power Offset | Number of Repetitions |
| --- | --- | --- |
| 00 | No change | No change |
| 01 | Decrease by 3 dB | Increase by 1 |
| 10 | Increase by 3 dB | Decrease by 1 |
| 11 | Increase by 6 dB | Decrease by 2 |

The changes could be with respect to pre-determined values, or to values sent using higher layer signalling, or to the current values The power offset values mentioned here could apply to DPCCH or HS-DPCCH, depending on the embodiment. Some restrictions might be placed on maximum and minimum values, particularly where the changes are relative to current values. The minimum number of ACK/NACK transmissions would obviously be limited to 1. In the case of only one bit available for signalling only two combinations could be used, for example as shown below:

| Signalled Bit | Power Offset | Number of Repetitions |
| --- | --- | --- |
| 0 | Decrease by 3 dB | Increase by 1 |
| 1 | Increase by 3 dB | Decrease by 1 |

In the case that the period of the power offset is more than a small number of slots, then modified power control operation could be considered. This could be applied over a similar time period to that for which any power offset is applied. As a specific example, in UMTS soft handover (where a MS 110 is in communication with two or more base stations 100, these being known as the active set) the power control action taken by the MS 110 is derived by considering power control commands sent from all the base stations in the active set. In a system made in accordance with the present invention this could be modified so that the MS 110 only or preferentially considers power control commands sent from the BS 100 which is also sending data packets for the duration of the modified power control operation.

As discussed above, the power level of the uplink data channel is determined from the power level of the second control channel, which is set by the BS using closed loop power control. The ratio of these two power levels is determined by a gain factor A which may be signalled to the MS 110 or determined independently by the MS. While the power increase is applied, the gain factor could be recalculated in order to keep the power level of the uplink data channel constant (relative to a target level). This is desirable in order to avoid generation of extra interference or affecting the quality of data sent on data channel.

For UMTS FDD mode the Uplink target SIR (which applies to the pilot field on the uplink DPCCH) can be signalled from the RNC (Radio Network Controller) to the BS 100 (or Node B). This mechanism could be used to increase DPCCH power on a long term basis and thereby improve ACK/NACK reliability, at the cost of increased interference. Using the method of the present invention, it would be desirable to provide extra signalling to indicate to the Node B the size of any temporary power offset to be applied to the target SIR when ACK/NACK is expected to be sent by the MS 110. Suitable values for the offset might, for example, be 0, 2, 4 or 6 dB.

One possible embodiment would be to apply the current invention only when the MS 110 is not in soft handover. When in soft handover (i.e. the MS 110 is in communication with more than one BS), the existing higher layer signalling could be used to increase the DPCCH power on a long term basis.

In UMTS, a mechanism for defining and quantising gain parameters and the resultant gain factor has already been defined. In a system made in accordance with the present invention, when a power offset is applied to the second control channel, new gain parameters need to be determined and quantised, the aim being to keep the power level of the uplink data channel at a similar level to what it would have been without the power offset applied to the second control channel. One way in which this can be performed is to compute the gain factor A as $$A = \frac{\beta_d}{\beta_c \times \Delta}$$

where $\beta_d$ is the gain parameter applying to the uplink data channel, $\beta_c$ is the gain parameter applying to the second uplink control channel, $\Delta = 10^{\delta/20}$, and $\delta$ is the additional power offset (in dB) to be applied to the second control channel. In the present UMTS specifications, the gain parameters are quantised to values of between 0 and 1 with each step being 1/15. Adapting this implementation, one embodiment of the present invention could operate so that:
if A>1, then new values should be set so that $\beta_d$=1 and $\beta_c$ is the largest quantised gain factor for which $\beta_c \leq 1/A$; and
if A≦1, then new values should be set so that $\beta_c$=1 and $\beta_d$ is the smallest quantised gain factor for which. $\beta_d \geq A$.

A similar set of modifications to the gain factor and parameters is required when Δ represents a decrease in power after the ACK/NACK message has been transmitted.

The operation of the present invention could be controlled (e.g. enabled, modified or disabled) by specific signalling messages. Additionally, this control could be carried out implicitly according to the values of parameters signalled for other purposes. For example, if operation of the invention is controlled by analysis of a predetermined number (K) of power control commands, operation could be disabled by the BS 100 signalling the value of K as zero.

The same approach as that described above could be used to improve the reliability of other signals transmitted on the first control channel, for example Channel Quality Information (CQI). The power offset used for other signals could be different from that used for ACK/NACK messages.

The above description is aimed at a downlink data channel in UMTS FDD (Frequency Division Duplex) mode. The invention could also be applied to TDD (Time Division Duplex) mode and to an uplink data channel.

The description above related to the BS 100 performing a variety of roles relating to the present invention. In practice these tasks may be the responsibility of a variety of parts of the fixed infrastructure, for example in a "Node B", which is the part of the fixed infrastructure directly interfacing with a MS 110, or at a higher level in the Radio Network Controller (RNC). In this specification, the use of the term "base station" or "primary station" is therefore to be understood to include the parts of the network fixed infrastructure involved in an embodiment of the present invention.

From reading the present disclosure, other modifications will be apparent to persons skilled in the art. Such modifications may involve other features which are already known in the design, manufacture and use of communication systems and component parts thereof, and which may be used instead of or in addition to features already described herein.

The invention claimed is:

1. A communication system having a downlink data channel for transmission of data packets from a primary station to a secondary station, a first uplink control channel for transmission of information relating to reception of data packets from the secondary station to the primary station, and a second uplink control channel for transmission of pilot information, the secondary station having receiving means for receiving a data packet and acknowledgement means for transmitting a status signal on the first uplink control channel to the primary station to indicate a status of a received data packet, wherein the secondary station comprises power control means for temporarily increasing a transmission power of at least a part of the second uplink control channel including the pilot information for a predetermined period during which the status signal is transmitted, and wherein the communication system further comprises an uplink data channel, a gain factor being defined as a ratio between the transmission power of the second uplink control channel and a transmission power of the uplink data channel, and means for adjusting the gain factor for a duration of a transmission power increase of the part of the second uplink control channel, thereby maintaining the transmission power of the uplink data channel at a similar level to that before the transmission power increase.

2. A primary station for use in a communication system having a downlink data channel for transmission of data packets from the primary station to a secondary station, a first uplink control channel for transmission of information relating to reception of data packets from the secondary station to the primary station, and a second uplink control channel for transmission of pilot information, wherein means are provided for receiving a status signal on the first uplink control channel indicating a status of a data packet transmitted to the secondary station, closed loop power control means are provided for controlling a power of the second uplink control channel, and means are provided for adjusting the operation of the power control means for a predetermined period around a time when transmission of the status signal by the secondary station is expected to take into account a temporary increase of a transmission power of at least the part of the second uplink control channel including pilot information, and wherein the communication system further comprises an uplink data channel, a gain factor being defined as a ratio between the transmission power of the second uplink control channel and a transmission power of the uplink data channel, and means for adjusting the gain factor for a duration of a transmission power increase of the part of the second uplink control channel, thereby maintaining the transmission power of the uplink data channel at a similar level to that before the transmission power increase.

3. The primary station as claimed in claim 2, further comprising means for signalling to the secondary station a magnitude of the transmission power increase which should be applied.

4. The primary station as claimed in claim 3, further comprising means for signalling a change in another parameter at the same time as a power offset is signalled.

5. The primary station as claimed in claim 4, wherein the other parameter is a number of repetitions of the status signal.

6. A secondary station for use in a communication system having a downlink data channel for transmission of data packets from a primary station to a secondary station, a first uplink control channel for transmission of information relating to reception of data packets from the secondary station to the primary station, and a second uplink control channel for transmission of pilot information, wherein receiving means are provided for receiving a data packet from the primary station and acknowledgement means are provided for transmitting a status signal on the first uplink control channel to the primary station to indicate the status of a received data packet, wherein power control means are provided for temporarily increasing a transmission power of at least a part of the second control channel including the pilot information for a predetermined period during which the status signal is transmitted, and wherein the communication system further comprises an uplink data channel, a gain factor being defined as a ratio between the transmission power of the second uplink control channel and a transmission power of the uplink data channel, and means for adjusting the gain factor for a duration of a transmission power increase of the part of the second uplink control channel, thereby maintaining the transmission power of the uplink data channel at a similar level to that before the transmission power increase.

7. The secondary station as claimed in claim 6, wherein an amount by which the transmission power is increased at a start of the predetermined period is different from an amount by which the transmission power is decreased at an end of the predetermined period.

8. The secondary station as claimed in claim 6, further comprising means for increasing the transmission power by different amounts depending on whether the status signal is an acknowledgement or a negative acknowledgement.

9. The secondary station as claimed in claim 6, further comprising means for increasing the transmission power by a first amount at a start of the predetermined period and by a second amount when a type of the status signal to be transmitted has been determined, the second amount depending on whether the status signal is an acknowledgement or a negative acknowledgement.

10. The secondary station as claimed in claim 6, further comprising means for resetting a timer on detection of an indication that a data packet has been transmitted to the secondary station, wherein the predetermined period lasts until the timer expires.

11. The secondary station as claimed in claim 6, further comprising means for communicating substantially simultaneously with a plurality of primary stations, for receiving power control commands from each of the primary stations and for receiving a data packet from any one of the primary stations, and means for setting the power of uplink transmissions depending on power control commands received from the primary station which transmitted the packet for the duration of the predetermined period.

12. A method of operating a communication system having a downlink data channel for transmission of data packets from a primary station to a secondary station, a first uplink control channel for transmission of information relating to reception of data packets from the secondary station to the primary station, and a second uplink control channel for transmission of pilot information, the method comprising the secondary station receiving a data packet and transmitting a status signal on the first uplink control channel to the primary station to indicate a status of a received data packet, wherein the secondary station temporarily increases a transmission power of at least the part of the second uplink control channel including the pilot information for a predetermined period during which the status signal is transmitted, and wherein the communication system further comprises an uplink data channel, a gain factor being defined as a ratio between the transmission power of the second uplink control channel and a transmission power of the uplink data channel, and means for adjusting the gain factor for a duration of a transmission power increase of the part of the second uplink control channel, thereby maintaining the transmission power of the uplink data channel at a similar level to that before the transmission power increase.

* * * * *